United States Patent

[11] 3,547,254

[72] Inventor Peter J. Manetta
    Warren, Mich.
[21] Appl. No. 795,493
[22] Filed Jan. 31, 1969
[45] Patented Dec. 15, 1970
[73] Assignee Simplex Corporation
    Detroit, Mich.
    a corporation of Michigan

[54] MECHANICAL FULL ACCUMULATING CONVEYOR
    9 Claims, 3 Drawing Figs.
[52] U.S. Cl. .................................................. 198/221,
    198/19
[51] Int. Cl. ................................................ B65g 25/08;
    B65q 5/22

[50] Field of Search .......................................... 198/19, 34,
    221

[56] References Cited
    UNITED STATES PATENTS
    3,385,418  5/1968  Broser .................... 198/221

Primary Examiner—Edward A. Sroka
Attorney—Whittemore, Hulbert & Belknap

ABSTRACT: A conveyor adapted to advance articles from station to station having means for setting all feed dogs to the rear of the foremost vacant station to operating position during initial forward movement of a feed slide.

PATENTED DEC 15 1970  3,547,254

INVENTOR.
PETER J. MANETTA
BY Whittemore
Hulbert & Belknap
ATTORNEYS

3,547,254

MECHANICAL FULL ACCUMULATING CONVEYOR

CROSS REFERENCE TO RELATED APPLICATIONS

The present invention is related to applicant's prior copending applications Ser. No. 578,094, filed Sept. 8, 1966, now abandoned and Ser. No. 763,819, filed Sept. 30, 1968.

BRIEF SUMMARY OF THE INVENTION

The accumulator is fully mechanical and comprises a reciprocating feed slide movable relative to an elongated support along which work pieces are to be advanced from station to station. The feed slide includes a multiplicity of article engaging feed members, particularly feed dogs, independently movable on the feed slide between feed and idle positions. Each station of the elongated support is provided with article sensing means including an actuating element movable between two positions dependent upon whether the station is occupied or vacant.

Carried by the feed slide are a multiplicity of independently movable bar segments each of which is pivoted to the feed slide by a pair of parallel links interconnecting the ends of the bar segments with the feed slide. The ends of the bar segments are engageable so that if an intermediate bar segment is moved in one direction, all similarly positioned bar segments in the direction of movement are similarly moved. Movement of each bar segment effects movement of a corresponding feed member to feed or idle position. Specifically, each feed member is formed by a portion of one link. The other link of the bar segment is provided with a follower engageable with the actuating element of the sensing means when the associated station is vacant.

The arrangement is such that if the delivery station at the front end of the conveyor or any intermediate station is vacant, the follower carried by the associated bar segment engages an actuating element of the sensing means during initial forward movement of the feed slide. The resulting movement of the bar segment causes the follower to move generally vertically into a position in which it passes across, and specifically beneath the actuating element of the sensing means. The same movement of the link causes the bar segment to move first upwardly and then downwardly to a position in which the feed member is in operating position. Further forward movement of the feed slide results in shifting forwardly by one station all work pieces to the rear of the foremost empty station.

A one-way movable actuator is carried by the support and is engageable by a portion of a link on the rearmost bar segment and is operable during initial return movement of the feed slide to swing all bar segments, and accordingly, all feed members to idle position in which they will pass beneath the work pieces in clearance with respect thereto.

DETAILED DESCRIPTION

Figure 1:
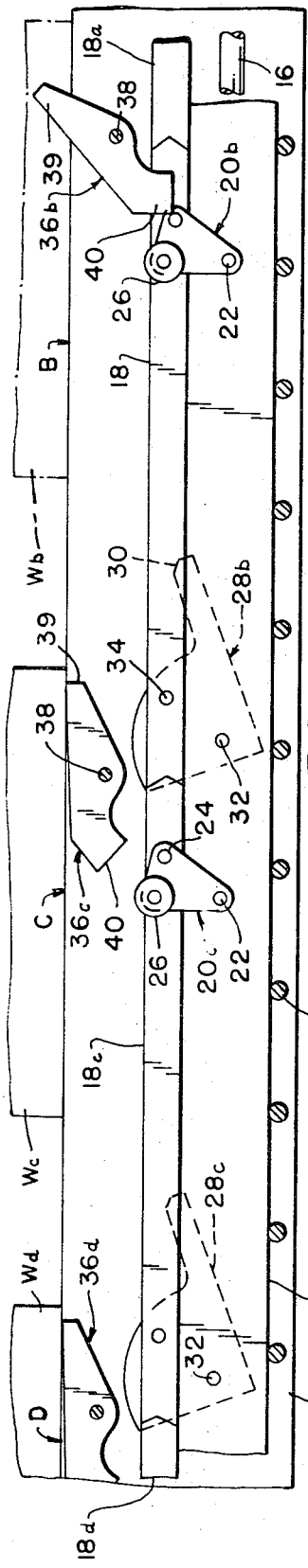
FIGS. 1—3 are diagrammatic elevational views showing the feed mechanism in different positions.

Described in general terms, the conveyor comprises an elongated stationary support which may conveniently be formed of two parallel rails. A reciprocating slide is provided and conveniently, may comprise a pair of elongated frame members on each of which are carried a plurality of end-abutting bar segments.

Since in general the two rails making up the support are identical, and since the frame members making up the slide are identical, it is simpler to illustrate only on e support member and one frame member of the slide. This will afford a complete understanding of the arrangement and operation of the mechanism.

The elongated support comprises a pair of rails one of which is illustrated at 10, and defines stations at which work means W may be supported. The rails 10 are stationary and in normal operation work pieces are supplied to the support at the rear end of the rails and the work pieces are advanced step by step from station to station until they reach the front, delivery or discharge end of the conveyor.

A feed slide 12 comprising a pair of elongated frame members, only one of which is visible in the drawings, is mounted for longitudinal reciprocation on suitable support means indicated as comprising rollers 14 which may be carried by the support 10. Means are provided for reciprocating the slide 12 and this means conveniently may take the form of a piston and cylinder device, a portion of a piston connected to the feed slide being indicated at 16. Mounted on the slide 12 are a series of bar segments generally designated 18, but further identified as 18a, 18b, 18c and 18d in the drawings. The bar segments 18 are independently movable but may be in end abutment as will subsequently be described so that movement of one segment in one direction will produce corresponding movement in the same direction of all similarly positioned bar segments located in the direction in which the first segment is moved. Each bar segment 18 is pivoted to the associated frame member 12 of the slide by a parallel linkage system. Adjacent the forward end of each bar segment 18 is a link, the links being generally designated 20, but further identified as 20b and 20c in the drawings. Each link 20 is pivoted as indicated at 22 to the slide 12 and is pivoted as indicated at 24 to the forward end of the associated bar segment 18. The link 20 is so formed as to include an arm displaced laterally from the link defined by the two pivots 22 and 24, and this arm is provided with a cam follower or roller 26. The other links connecting the bar segments 18 to the frame member 12 of the slide comprise feed members generally designated 28, but identified as members 28b and 28c in the drawings, the feed member 28b being connected to bar segment 18b, and feed member 28c being connected to bar segment 18c. The feed members have actuating extension arms 30 adapted to be moved between idle and feed positions. The feed members 28 are pivoted as indicated at 32 to the slide 12 and as indicated at 34 to the associated bar segment 18 adjacent the rear end thereof. It will be understood that the parallel linkage comprises the portions of the links 20 and 28 intermediate the pivot connections 22, 24 and 32, 34.

Mounted on a rail 10 of the stationary support are article sensing members generally designated 36, but separately identified in the drawings as 36b, 36c and 36d. These members are pivoted as indicated at 38 to the support 10 and are so constructed that when there is no work piece at the associated station, the sensing members move by gravity to the positions shown at 36b at the right of FIG. 1. In the drawings, the work pieces are designated generally as W, but are separately identified as Wb, Wc and Wd. In the description of the operation, it is assumed that no work piece is present at the station adjacent article sensing member 36b. Accordingly, the dot and dash representation identified as Wb in fact indicates the location which would be occupied by a work piece, but the station is assumed to be vacant. The location of the sensing members 36b, 36c, etc. defines stations along the support 10, stations B, C and D being designated in FIG. 1. Sensing members 36 include work engaging arms 39, and actuating arms or elements 40 which constitute cams operable to effect movement of the feed members 28 to the position required to carry out the desired feeding sequence. Elements 40 may be a part of members 36, or may be laterally projecting cams carried thereby, as suggested at 40c. For this purpose the actuating elements 40 are in the path of movement of the rollers 26. Accordingly, as the feed slide including the frame members 12 moves to the right from the position shown in FIG. 1, the rollers 26 engage the depending actuating elements 40 of the sensing members at each vacant station, such as station B. At the same time, at stations occupied by a work piece such as stations C and D, the sensing members 36c and 36d are held in the illustrated position so that their cam portions or actuating elements 40 lie above the path of the adjacent roller 26.

It will be observed that on the return movement of slide 12, to the left as seen in the FIGS., rollers 26 engage the forward surface of the lower end of members 36 of vacant stations, and swing such members out of the way as they pass beneath them.

The bar segments 18, as previously described, have their ends in abutment and preferably, these ends are respectively concave and convex as illustrated in the FIGS. It will be observed that when the bar segments 18 are in the forward position, as all segments are illustrated in FIG. 1, the feed member 28 and arm 30 constituting one of the links thereof is in its idle position.

Figure 2:
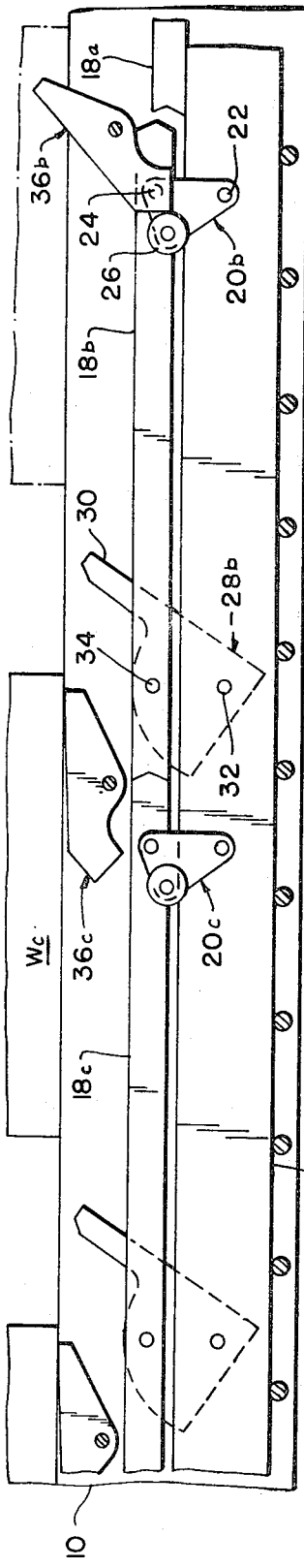

Forward movement of the slide frame member 12 to the position shown in FIG. 2 brings the roller 26 of link 20b into engagement with the roller camming portion 40 of the sensing member 36b at the vacant station B at the right in FIG. 1. It will be observed that initially the axis of roller 26 lies directly above the pivot 22 so that as the link 20 is swung counter-clockwise, the roller 26 moves generally downwardly in a circular arc about the pivot 22. The resulting movement of the link 20b is imparted to the bar segment 18b which is thus caused to move upwardly and rearwardly and finally downwardly, partly by gravity, into abutment with the upper surface of the slide 12. In FIG. 2 the parts are shown in an intermediate position in which the link 20b has moved to a position such that the pivot 24 is directly above the pivot 22. Thus, the bar segment 18b as illustrated in this FIG., is in its uppermost position, separated from segment 18a, and further movement causes the bar segment to move rearwardly and downwardly. Thus, the bar segment is biased by gravity from the position illustrated in FIG. 2 to the operating position shown in FIG. 3.

It will be observed that during this movement of the bar segment 18a, the roller 26 continues to move downwardly until it reaches the position illustrated in FIG. 3, at which time it is located substantially below the roller camming portion 40 of the sensing member 36b. Accordingly, the feed member 28b which will traverse vacant station B is moved to the operating position in which its extension 30 extends above the rail 10 and would be adapted to engage a work piece, if a work piece were present at station B.

Inasmuch as the station B determined by the location of the sensing member 36b is vacant, movement of the extension 30 of feed member 28b to the operating position will not result in feeding movement of a work piece since there is no work piece at station B. In fact, it is the absence of a work piece at the station B which permits the sensing member 36b to move to the position to swing the bar segment 18b and actuating member 28b to the operating position. However, by arranging for movement of the feed member which will traverse the foremost empty station to feed position, a simplification of structure results, particularly in the compactness of parts 20, 36.

While the feed arm 30 of member 28b will not engage a work piece on the forward movement of the slide 12, upwardly and rearwardly swinging movement of the bar segment 18b will result in corresponding movement of the next rearmost bar segments 18c and 18d, as well as all bar segments to the rear thereof. Thus, all of the feed members 28 located to the left or rearwardly of the feed member 28b will be swung counterclockwise to operating position irrespective of presence or absence of a work piece at the associated stations.

It is stressed that the sensing of the presence or absence of work pieces at stations and the movement of the appropriate feed members to feeding position is accomplished during the initial forward movement of the feed slide 12.

It will be understood that the ultimate purpose of the system is to make work pieces available at the discharge or delivery station, but that the work pieces are removed from this station by the operator. Accordingly, the link 28 constituting part of the support of the foremost bar segment which responds to presence of absence of a work piece at the delivery station omits the work engaging arm 30.

In order that all feed members shall be returned to idle position before they engage the following work piece on return stroke of the feed slide 12, means are provided for effecting positive forward swinging of the rearmost bar segment located at the end of the conveyor to which articles are supplied. Carried by the support 10 is an arm 42 which is pivoted as indicated at 44 for movement away from a fixed abutment 46.

It is to be understood that the location of the arm 42 on the support 10 is such that the roller 26 of the link 20 connected to the end bar segment 18 at the rearmost station engages the front of arm 42 on its initial return movement following completion of a feed stroke. The lever or arm 42 for convenience is illustrated as associated with an intermediate link 20c in FIG. 3, but as explained above, in practice will be associated with the link 20 connected to the rearmost bar segment.

Figure 3:
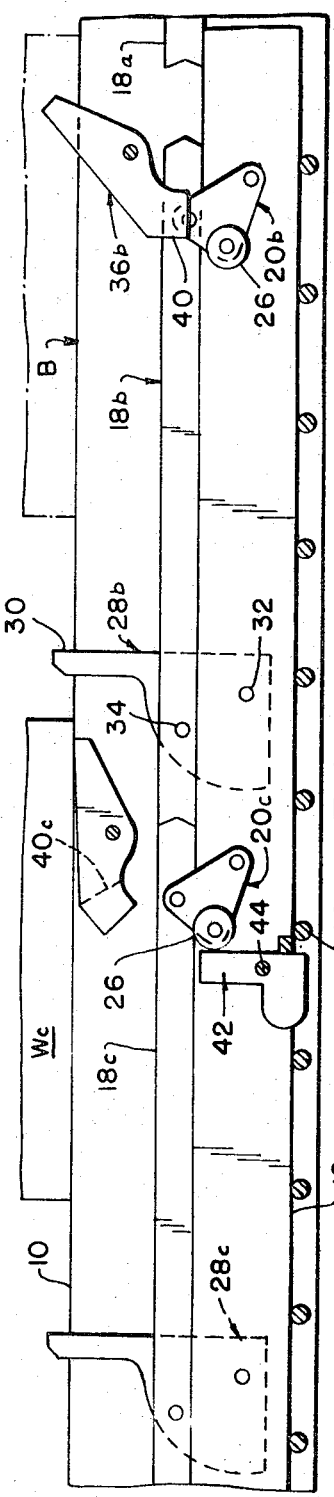

In the position illustrated in FIG. 3 the roller 26 of the link 20c is in position to engage the forward side of arm 42 upon initial return movement of the slide 12. Further movement of the slide to the left as viewed in FIG. 3, will cause the link 20c to swing clockwise until the roller moves upwardly sufficiently to pass over the top of the arm 42. This will have moved the bar segment 18c and all bar segments to the right thereof to the forward or inoperative position of the associated feed members 28. Since arm 42 is associated with the link 20 connected to the left-hand segment 18 as seen in the FIGS. all feed members are in idle position.

From the foregoing the operation of the system is believed to be apparent. When the system is initiated articles are introduced one at a time to the left-hand end of the system and are advanced one station during each reciprocation of the feed slide 12. Eventually, every station including the delivery station at the right of the system, is occupied by an article at which time all of the article sensing members or levers 36 are in the inoperative position illustrated by the lever 36c at station C in FIG. 1. Thereafter, the feed slide may reciprocate with appropriate dwells intermediate reciprocations without shifting any of the feed members 28 to article feeding position. When the article at the right hand or delivery station is removed, the corresponding dog or lever 36 will move the operating position corresponding to the position illustrated by the dog or lever 36b at the station B in FIG. 1. The bar segment located beneath the delivery station at the right-hand end of the conveyor is supported by parallel links but the link at the left-hand end thereof does not include the article engaging extension 30 since it is never desired to feed the article off the delivery end of the conveyor. However, movement of the associated bar segment 18 is transmitted to all of the bar segments to the left and accordingly, all of the feed members 28 including the feed extensions 30, are shifted to article feeding position.

It often happens that the supply of articles to the conveyor is interrupted for a substantial period so that while articles continue to be advanced to the delivery station at the right-hand end of the system, the stations at the left-hand or receiving end of the system may become vacant. When articles are again available for supply to the conveyor an article is moved onto the left-hand station and is adapted to be moved forwardly during the next forward and return stroke of the feed slide.

Since all of the feed members are moved to inoperative position upon initiation of the return movement of the feed slide, the feed member at the left-hand end of the system which is operable to advance a work piece from the first station of the system, is at this time in inoperative position. However, if there is no work piece at the second station or the station next adjacent the loading station at the left-hand end of the system, then initial forward movement of the feed slide 12 will result in swinging the associated feed member 28 in a counterclockwise direction and to move the feed extension 30 thereof into feeding position.

The foregoing arrangement ensures that just prior to forward stroke of the feed slide, there is a sensing of each station to determine whether or not it is vacant. If any station is occupied and if there are no vacant stations forwardly thereof, then the feed member cannot be moved to feed position.

The advantages of this system are to be contrasted with a system in which the sensing of occupancy of the stations occurs during return movement of the feed slide. If this happens a feed member may be moved to feeding position and will remain in this position even though an article is placed in a vacant station during the rest interval between reciprocations of the feed slide.

The drawing and the foregoing specification constitute a description of the improved mechanical full accumulating conveyor in such full, clear, concise and exact terms as to enable any person skilled in the art to practice the invention, the scope of which is indicated by the appended claims.

I claim:

1. A conveyor system comprising an elongated support having a series of stations along which a plurality of articles are movable from station to station, a reciprocating feed slide movable longitudinally of said support, a plurality of feed members spaced along said slide and being independently movable thereon for movement between feed and idle positions, sensing and control mechanism for sensing the presence or absence of an article on said support at each station thereon, for shifting the feed member to the rear of the article to the rear of the first empty station from the delivery end to feed position, and for shifting all feed members to the rear of said last-named feed member to feed position, said mechanism comprising a movable sensing member carried by said support at each station, feed member actuating means carried by said slide engageable with the sensing members at vacant stations during initial forward movement of said slide to move the feed member to the rear of the first vacant station from the delivery end to feed position, and positive acting mechanical means operable as a consequence of operation of any one feed member actuating means to operate all feed member actuating means to the rear of said one feed member actuating means to move all feed members to the rear of the feed member of the rear of the first vacant station to feed position.

2. A system as defined in claim 1 in which said feed member actuating means comprises an elongated rigid bar segment for each station, and parallel links connecting opposite ends of each link to said slide, said bar segments being in endwise alignment and operable to transmit movement therebetween.

3. A system as defined in claim 2 in which said feed member includes a portion forming one of said links.

4. A system as defined in claim 2, said slide comprising an elongated frame member, said bar segments being pivoted by said links to said frame member and being movable thereon between feed and idle positions in which said segments rest on said frame member.

5. A system as defined in claim 4 in which one of said links mounting each bar segment includes a cam follower movable between upper and lower positions as said bar segments move generally vertically through an arcuate path, said following being movable vertically by engagement with a portion of the associated sensing member and then movable across said portion during the following feed movement of said slide.

6. A system as defined in claim 2 in which a link connecting the forward end of each bar segment comprises an arm having a follower thereon movable generally downwardly as the forward end of the bar segment moves first upwardly and then downwardly, and each sensing means comprises a cam element movable into position to be engaged by the associated follower and to swing it downwardly to a position in which it passes under said cam portion.

7. A system as defined in claim 6 in which a link at the rear of each bar segment includes a work engaging portion movable between feed and idle positions as the associated bar segment is moved generally forwardly and rearwardly relative to said slide.

8. A system as defined in claim 1, comprising means operable as a consequence of initial return movement of said slide to return all of said members to idle positions.

9. A system as defined in claim 8 in which the means for returning said feed members to idle positions comprises a one-way movable abutment on said support engageable with the cam follower on a link of the rearmost bar segment.